US009619215B2

United States Patent
Eble et al.

(10) Patent No.: US 9,619,215 B2
(45) Date of Patent: Apr. 11, 2017

(54) PRE-COMPILER

(71) Applicants: Markus Eble, Walldorf (DE); Soeren Pottberg, Karlsruhe (DE)

(72) Inventors: Markus Eble, Walldorf (DE); Soeren Pottberg, Karlsruhe (DE)

(73) Assignee: SAP SE, Walldorf (DE)

( * ) Notice: Subject to any disclaimer, the term of this patent is extended or adjusted under 35 U.S.C. 154(b) by 6 days.

(21) Appl. No.: 14/555,044

(22) Filed: Nov. 26, 2014

(65) Prior Publication Data
US 2016/0147511 A1 May 26, 2016

(51) Int. Cl.
G06F 9/45 (2006.01)

(52) U.S. Cl.
CPC ............ G06F 8/4434 (2013.01); *G06F 8/427* (2013.01)

(58) Field of Classification Search
CPC .............................. G06F 8/4434; G06F 8/427
USPC ......................................................... 717/177
See application file for complete search history.

(56) References Cited

U.S. PATENT DOCUMENTS

| 6,611,844 B1 * | 8/2003 | Saulpaugh | ........ G06F 17/30607 |
| 6,745,384 B1 * | 6/2004 | Biggerstaff | ........... G06F 8/4441 |
| | | | 712/203 |
| 8,418,145 B2 * | 4/2013 | Cirne | .................. G06F 11/3612 |
| | | | 717/116 |
| 8,601,453 B2 * | 12/2013 | Gennard | ................. G06F 8/433 |
| | | | 717/140 |
| 2003/0041312 A1 * | 2/2003 | Fueki | .................. G06F 15/7867 |
| | | | 717/100 |
| 2007/0169039 A1 * | 7/2007 | Lin | ........................... G06F 8/34 |
| | | | 717/146 |
| 2009/0307673 A1 * | 12/2009 | Eichenberger | .......... G06F 8/452 |
| | | | 717/160 |
| 2011/0066999 A1 * | 3/2011 | Rabinovich | ............... G06F 8/51 |
| | | | 717/104 |
| 2012/0110559 A1 * | 5/2012 | Dolinsky | .................. G06F 8/45 |
| | | | 717/143 |
| 2012/0159459 A1 * | 6/2012 | Turner | .................... G06F 8/314 |
| | | | 717/138 |
| 2013/0007065 A1 * | 1/2013 | Grechanik | ........ G06F 17/30908 |
| | | | 707/802 |

(Continued)

OTHER PUBLICATIONS

Alkis Evlogimenos, "Improvements to linear scan register allocation", Technical Report, University of Illinois, 15 pages, 2004.

(Continued)

*Primary Examiner* — Li B Zhen
*Assistant Examiner* — Sen Chen
(74) *Attorney, Agent, or Firm* — Brake Hughes Bellermann LLP

(57) ABSTRACT

A method for reducing a compile time of a source program includes receiving, by a compiler hosted on a computer, the source program. The compiler may have a compile time that depends non-linearly on a size of a function in the source program. The method involves identifying a source function in the source program and splitting the source function in to two or more target functions having sizes smaller than a size of the source function. The method further includes compiling the source program with the two or more target functions having sizes smaller than a size of the source function replacing the source function in the source program.

20 Claims, 16 Drawing Sheets

(56) References Cited

U.S. PATENT DOCUMENTS

| | | | |
|---|---|---|---|
| 2014/0137088 A1* | 5/2014 | Mitchell | G06F 8/53 717/143 |
| 2014/0282439 A1* | 9/2014 | Kannan | G06F 8/76 717/140 |
| 2014/0359587 A1* | 12/2014 | Villadsen | G06F 8/41 717/143 |
| 2015/0222730 A1* | 8/2015 | Gower | G06F 9/542 709/203 |

OTHER PUBLICATIONS

Richard E. Hank, "Region-Based Compilation", PhD thesis, University of Illinois, 1996. Abstract Only.

Chris A. Lattner, "LLVM: An infrastructure for multi-stage optimization", Master's thesis, University of Illinois, 68 pages, 2002.

Jun-Pyo Lee, Jae-Jin Kim, Soo-Mook Moon, and Suhyun Kim, "Aggressive function splitting for partial inlining", In Proceedings of the 2011 15th Workshop on Interaction between Compilers and Computer Architectures, pp. 80-86. IEEE Computer Society, 2011. Abstract Only.

Karl Pettis and Rober C. Hansen, "Profile guided code positioning", In Proceedings of the ACM SIGPLAN 1990 conference on Programming language design and implementation, pp. 16-27. ACM, 1990. Abstract Only.

Massimiliano Poletto and Vivek Sarkar, "Linear scan register allocation", ACM Transactions on Programming Languages and Systems (TOPLAS), 21(5), 19 pages, 1999.

Soren Pottberg, "Analysis of the LLVM register allocation algorithm", Internal Project Report, 62 pages, 2013.

Omri Traub, Glenn Holloway, and Michael D. Smith, "Quality and speed in linear-scan register allocation", In Proceedings of the ACM SIGPLAN 1998 conference on Programming language design and implementation, pp. 142-151, 1998.

Tom Way and Lori Pollock, "Region formation analysis with demand-driven inlining for region-based optimization", In Proceedings 2000 International Conference on Parallel Architectures and Compilation Techniques, pp. 24-33. IEEE, 2000.

Tom Way and Lori Pollock, "Evaluation of a region-based partial inlining algorithm for an ILP optimizing compiler", In International Conference on Parallel and Distributed Computing and Systems (PDCS 2002), pp. 552-556, 2002.

Peng Zhao, "Code and Data Outlining", PhD thesis, University of Alberta, 111 pages, 2005.

Peng Zhao and Jose Nelson Amaral, "Function outlining and partial inlining", In 17th International Symposium on Computer Architecture and High Performance Computing, pp. 101-108. IEEE, 2005. Abstract Only.

Richard E. Hank, Wen mei W. Hwu, and B. Ramakrishna Rau, "Region-based compilation: An introduction and motivation", In 28th Annual International Symposium on Microarchitecture, pp. 158-168. IEEE, 1995.

Raghavan Komondoor and Susan Horwitz, "Semantic-preserving procedure extraction", In Proceedings of the 27th ACM SIGPLAN-SIGACT symposium on Principles of programming languages, pp. 155-169. ACM, 2000.

Thomas Kotzmann, Christian Wimmer, Hanspeter Mossenbock, Thomas Rodriguez, Kenneth Russell, and David Cox, "Design of the Java HotSpotTM client compiler for java 6", ACM Transactions on Architecture and Code Optimization (TACO), 5(7), 32 pages, 2008.

Toshio Suganuma, Toshiaki Yasue, and Toshio Nakatani, "A region-based compilation technique for a java just-in-time compiler", In Proceedings of the ACM SIGPLAN 2003 conference on Programming language design and implementation, pp. 312-323, 2003.

Hanspeter Mossenbock and Michael Pfeiffer, "Linear scan register allocation in the context of SSA form and register constraints", In Proceedings of the 11th International Conference on Compiler Construction, p. 229-246. Springer-Verlag, 2002.

Robert Muth and Saumya Debray, "Partial inlining", Technical report, University of Arizona, pp. 1-12,1997.

* cited by examiner

EXTRACT OF ABSTRACT SYNTAX TREE 300
(Function Definition)

Function 5

```
Void main(Bool c) {
  Int32 a;
  if(c) {
    int32 b = 42;
    a = b;
  }
}
```

EXTRACT OF ABSTRACT SYNTAX TREE 400
(Function Body)

SCOPE HEIRARCHY 500
(Function Definition and Function Body)

AST before Function Splitting

700

Possible transformed AST after
Function Splitting

800

Input: *blockStatement, minComplexity, maxComplexity*
Result: A set of splitting regions given by their start and end node
for *statement in blockStatement* do
 if *splittingCandidate does not exist* then
  create *splittingCandidate*;
  set *statement* as start of *splittingCandidate*;
 end
 if *statement is not splittable OR statement is a variable declaration* then
  // statement cannot be split
  finish(*splittingCandidate, minComplexity*);
 else
  *complexity* ← calculate complexity of *statement*;
  *candiateComplexity* ← complexity of *splittingCandidate*;
  if *candiateComplexity + complexity > maxComplexity* then
   // statement does not fit into splitting candidate
   finish(*splittingCandidate, minComplexity*);
   create *splittingCandidate*;
   set *statement* as start of *splittingCandidate*;
  end
  set *statement* as end of *splittingCandidate*;
  increase complexity of *splittingCandidate* by *complexity*;
 end
end
if *splittingCandidate exists* then
 finish(*splittingCandidate*);
end

Input: *splittingCandidate, minComplexity*
if *complexity of splittingCandidate ≥ minComplexity* then
    create splitting region for *splittingCandidate*;
end
delete *splittingCandidate*;

Input: *blockStatement, minComplexity*
*complexity* ← calculate complexity of *blockStatement*;
if *blockStatement is splittable AND complexity ≥ minComplexity* then
    create splitting region for *blockStatement*;
end

```
insideRegion ← false;
i ← 0;
foreach statement in source statement list do
    // Check if a region is entered
    if not insideRegion & i < R.length then
        if statement = R[i].start then
            insideRegion ← true;
            append function call to remaining block statement;
        end
    end
    // Move the statement to the desired location
    if insideRegion then
        append statement to target block statement of current region;
    else
        append statement to remaining block statement;
    end
    // Check if a region is left
    if insideRegion then
        if statement = R[i].end then
            insideRegion ← false;
            i ← i + 1;
        end
    end
end
```

PRE-COMPILER

BACKGROUND

A compiler enables development of computer programs that are machine-independent. The compiler is configured to translate a computer program (source code) written in a machine-independent higher level language (e.g., C, COBOL, or BASIC, etc.) into a machine-dependent language or code to be executed on different computer hardware architecture. In other words, a compiler translates a high-level source program into a target program written in a machine language for specific computer hardware. Once a target program is generated for the specific computer hardware, a user can execute the target program on the specific computer hardware. The machine-dependent language often has a binary form known as object code.

In some technologies (e.g., in-memory databases) in which programs are created dynamically during execution, a Just in Time (JIT) compiler can be used. A JIT compiler can translate the source code of a computer program (written, for example, in Llang) in to machine code during runtime. However, actual execution of the computer program may be delayed in runtime by time it takes the compiler to translate the source code of the computer program in to executable machine code ("compile time").

The compile time for a computer program/source code can depend on the number and the sizes of programming functions ("functions") used in the source code. In particular, the time to compile (or compile time) can have a non-linear dependence on the sizes of the programming functions. A large size programming function (e.g., such as generated by automatic source code generators) can dramatically increase compile time compared to a small size programming function (e.g., such as in human-written source code).

Consideration is now being given to compiler configurations and methods in view of the compile times for computer programs/source code. In particular, attention is directed to mitigating or managing the effect of programming functions in source code on the compile times.

SUMMARY

In a general aspect, a method for reducing a compile time of a source program includes receiving, by a compiler hosted on a computer, the source program. The method involves analyzing the source program to construct an Abstract Syntax Tree (AST) representation of the source program. The nodes of the AST represent one or more of language constructs, statements, expressions, types, and function definitions of the source program. The method includes identifying a candidate splitting region of a source function in the AST and extracting the candidate splitting region of the source function to form a target function. The method further involves transforming the AST by inserting nodes corresponding to the target function and using the transformed AST to generate a machine-executable target program.

The details of one or more implementations are set forth in the accompanying drawings and the description below. Other features will be apparent from the description and drawings, and from the claims.

BRIEF DESCRIPTION OF THE DRAWINGS

FIG. 10 is a pseudo code representation of an example algorithm configured to identify candidate splitting statements to define splitting regions on a block statement, which have complexities that are limited by a given minimal and a given maximal complexity, in accordance with the principles of the disclosure herein.

FIG. 11 is a pseudo code representation of an example algorithm configured to transform a candidate splitting statement into a splitting region with statement level splitting granularity, in accordance with the principles of the disclosure herein.

FIG. 12 is a pseudo code representation of an example algorithm configured to transform a candidate splitting statement into a splitting region with block statement level splitting granularity, in accordance with the principles of the disclosure herein.

FIG. 17 illustrates is a pseudo code representation of an example algorithm example algorithm 1700 that may be used by the process of FIG. 13 to move each statement of a source block statement to either the remaining source block statement or to the target block statement of a splitting region, in accordance with the principles of the present disclosure.

DETAILED DESCRIPTION

A computing system may include one or more computing devices (e.g., laptop computers, desktop computers, workstations, smartphone, servers, etc.) and databases. The databases may provide or support one or more high level languages for computer programs. The computing system may be configured to run the high level language computer programs (e.g., business application software) on one or more of the devices in the system.

Figure 1:
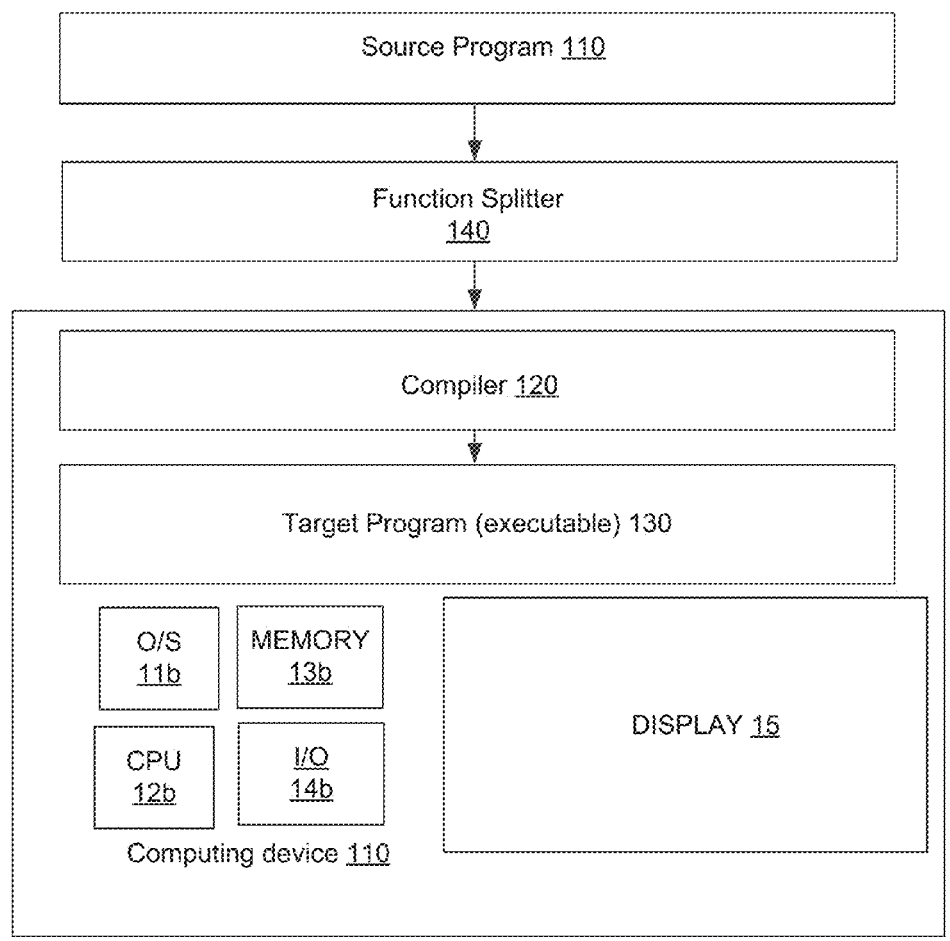
FIG. 1 is a schematic block diagram illustration of a computing device including a compiler, in accordance with the principles of the disclosure herein.

FIG. 1 shows, for example, an example computing device 100 which may be configured to run a source program 110 (e.g., a business application), in accordance with the principles of the present disclosure. Computing device 100 may be a micro-processor based computing machine that includes semiconductor-based microprocessors, memory, and other computer hardware and software. For example, computing device 100 may include an O/S 11b, a CPU 12b, a memory 13b, and an I/O 14b. Computing device 100 may further include or host a complier 120, which is configured to translate source program 110 into a target program 130 that can be machine executed (e.g., by CPU 12b) in accordance with the principles of the present disclosure.

Source program 110 may include one or more programming functions ("functions"). For purposes of illustration an example function "Function 1" in source program 110 may be as follows:

```
Function 1
Void originalFct(Int32 i, Int32& o) { Int32 j = 42;
Int32 k = 4771;
o = i + o + j; o = o + k;
}
```

Compiler 120 may include algorithms to compile or translate source program 110 at a function-level granularity into machine executable target program 130.

While Function 1 as shown above for purposes or illustration is only a few lines long, source program 110 may include functions of large size as they are meant to be machine read and not suitable for human reading. For example, source program 110, may be special purpose programming language "L-lang" implementation of the high level languages provided or hosted by the databases in the computer system. A machine readable L-lang function in source program 110 may typically contain a few thousands of lines of code.

The compile times for source program 110 using function-level granularity can increase non-linearly with the size of the functions (e.g., Function 1) in source code 110. A function in source code 110 implemented in L-lang, which, for example, has several thousands of code lines, may have a compile time of several minutes or even hours long.

However, the example implementations of compiler 120, as described herein, may include "function splitting" algorithms or processes to prepare or pre-process source program 110 to decrease compile time, in accordance with the principles of the disclosure herein. The function splitting algorithms or processes may split or divide large size functions in source program 110 into smaller size functions, which can be compiled substantially more quickly than the large size functions.

For example, example Function 1 shown above may be split into smaller functions—Function 2, Function 3 and Function 4, as follows:

```
Function 2
Void subFct0(Int32& i, Int32& o, Int32& j) { o = i + o + j;
}
Function 3
Void subFct1(Int32& o, Int32& k) { o = o + k;
}
Function 4
Void originalFct(Int32 i, Int32& o) { Int32 j = 42;
Int32 k = 4771;
subFct0(i, o, j);
subFct0(o, k);
}
```

In the example implementations of compiler 120, the function splitting algorithms or processes for splitting or dividing a large size function (e.g., Function 1) in source program 110 into smaller size functions (e.g., Function 2, 3, and 4) may involve setting a pre-determined sized limit for code blocks and lines ("collection") for a smaller size function. To split a smaller size function from a "to-be-split" large size function in source program 110, the function splitting algorithms or processes may involve incrementally collecting code blocks and lines from the "to-be-split" function until the predetermined collection size limit is reached. The collection may be used to form the smaller size function. The function splitting algorithms or processes may further involve ensuring that the collected code blocks and lines do not contain variable declarations that are alive outside of the collection, and passing all variables, which are used inside the collection but declared outside the collection, as parameters to the smaller size function.

The aforementioned function splitting algorithms or processes may ensure that the semantics of source program 110 are preserved and the impact of function splitting on runtime is negligible. It will however be noted that the aforementioned function splitting algorithms or processes may not guarantee that function splitting will necessarily occur. For example, function splitting may be prevented by exit instructions (e.g., return, break, continue) or by variable declarations in the middle of a code block of the source function.

A function splitting unit 140, which may be hosted on computing device 100 or other device, may include function splitting algorithms or processes to split or divide large size functions in source program 110 into smaller size functions, which by virtue of their size can be quickly compiled by complier 120. In some implementations, compiler 120 may be configured or used as a just-in-time compiler. While FIG. 1 (and FIG. 2) shows, for example, function splitting unit 140 as a separate pre-processing unit from compiler 140, it will be understood that function splitting unit 140 may be an integral part of compiler 120. In any case, the operation of the function splitting algorithms or processes of function splitting unit 140 may be integrated with the operation and processes of complier 120.

Complier 120 may, for example, include front end analysis phases and backend synthesis phases in a process for compiling source program 110. The front end analysis phases may include processes to analyze the source program and create a tree-based representation of the source code (e.g., the so-called Abstract Syntax Tree (AST)). Information about the source program may be collected in a symbol table, and syntactic or semantic errors in the source program reported in the front end analysis phases. The backend synthesis phases may include processes to generate machine-executable target program 130 based on the information collected by the front end phases.

The Abstract Syntax Tree (AST) may be a data structure reflecting the hierarchical structure of the source program. The AST may be a simplified representation of the syntax tree reflecting the structure of the source program according to the grammar of the language. The nodes of the AST may represent language constructs such as statements, expressions, types, or function definitions. The AST nodes may be annotated with semantic information. The front end analysis phases may, for example, provide the AST nodes with type information and information used for optimizations of the complied programs.

Figure 2:
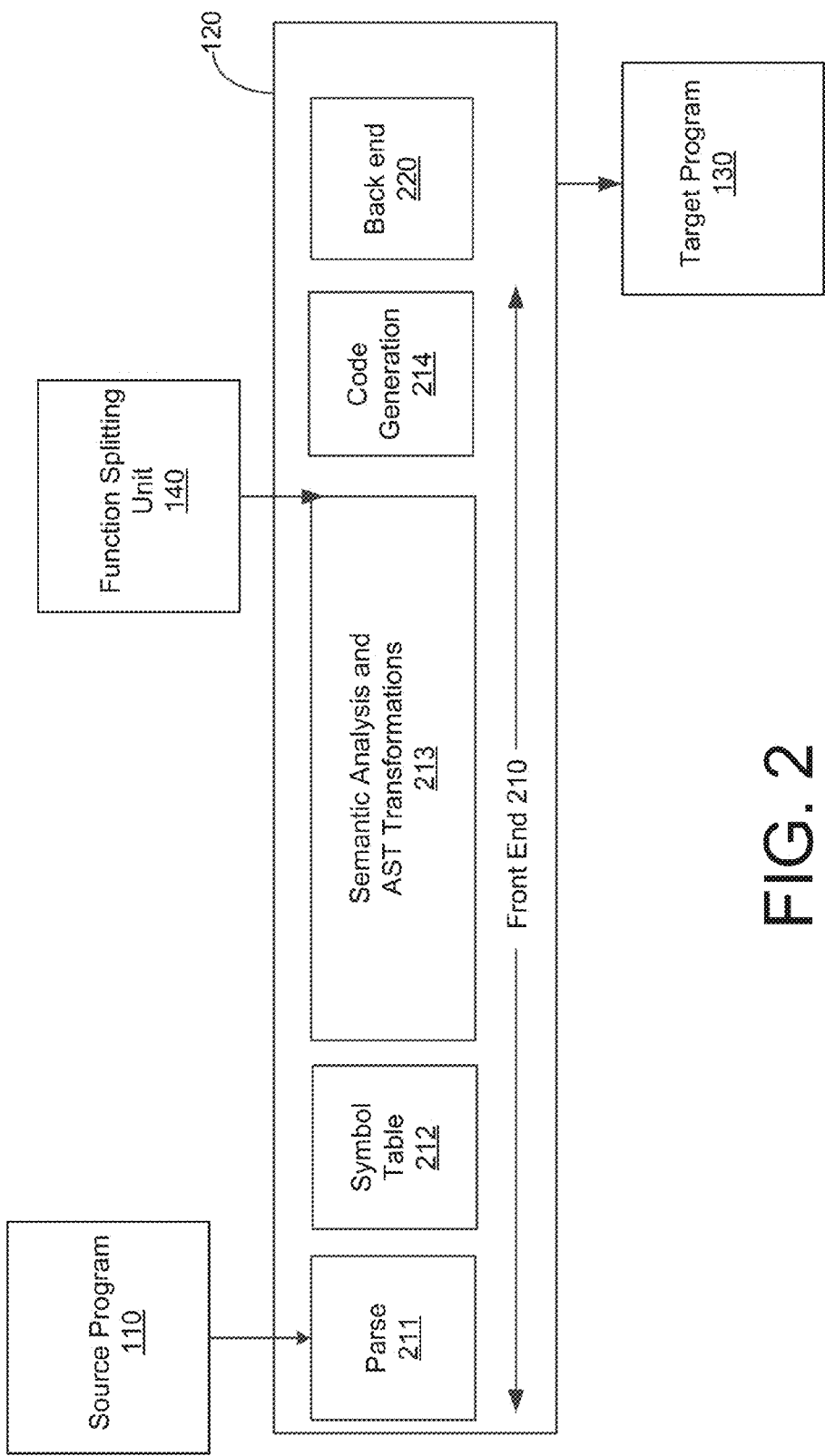
FIG. 2 is a schematic block diagram illustration of an example complier including a frontend and a backend for compiling a source program 11o, in accordance with the principles of the disclosure herein.

As shown in FIG. 2, example complier 120 may include a frontend 210 and a backend 220 for compiling source program 110. In an example implementation, frontend 210 may include several compilation process modules or phases (e.g., Parse 211, Symbol Table 212, Semantic Analysis and AST Transformations 213 ("Semantic Analysis 213"), and Code Generation 214).

In complier 120, parse phase 211 may include a lexer and parser for lexical and syntax analysis, respectively, of source program 110. Parse phase 211 may be configured to create an AST representing source program 110 and annotate the AST nodes with code locations.

Further, in complier 120, symbol table phase 212 mat be configured to generate a symbol table (e.g., with symbols for Variables, Parameters, Functions, Data types, Library Names, and Namespaces, etc.). Each entry in the symbol table may include a key and a value. Except for variables and parameters, all symbols may be defined globally and identified by their name. Variables and parameters entries in the symbol table may be declared for limited scopes (i.e. non-global scopes). The variable and parameter scopes may be used for identification. Therefore, the symbol table may create scopes and build up a scope hierarchy. The symbol table may virtually assign scopes to all AST nodes. Symbol information inserted in the symbol table may also be attached to some AST nodes (e.g., nodes which use the defined symbols). Symbol table phase 212 may report an error, for example, if a symbol is declared twice or if a previously undeclared symbol is referenced.

Further, in complier 120, semantic analysis phase 213 may be configured to check semantic correctness of the code including, for example, checks for correct nesting of statements, unreachable code, unambiguousness of loop labels, and alias analysis. Code generation phase 214 may be an intermediate code (IR) generator. Code generation phase 214 may, for example, be configured to generate a platform-independent byte code as an Intermediate Representation (IR) of the source code in the compilation process. The IR output of code generation phase 214 may be optimized by machine-independent transformations. Compiler 120 may be configured so that all syntactical and semantic checks are accomplished in the front end phases (e.g., phases 211-213) prior to code generation phase 214 so that operations of code generation phase 214 may be expected to succeed and not throw any errors.

Backend 220 in complier 120 (for compiling source program 110 as machine-executable target program 130) may be configured to accept the IR generated by code generation phase 214 as input and to operate in passes at a function level to generate the final target code (e.g., target program 130). Prior to final target code generation, backend 220 may be configured to transform the input IR to a low level machine-dependent IR. The machine-dependent IR may be used to perform machine-dependent optimizations. Backend 220 may also be configured to perform register allocation for target program 130 using, for example, a greedy register allocator or a linear scan allocator.

Figure 3:
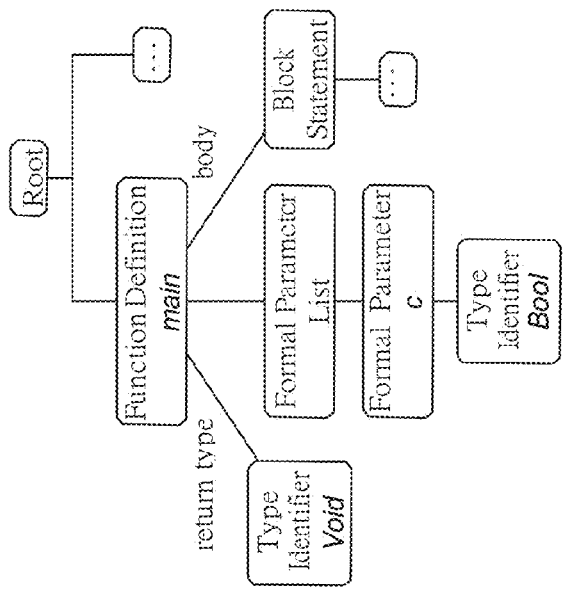
FIG. 3 is an illustration of an example extract of an Abstract Syntax Tree (AST) represent a function definition, in accordance with the principles of the disclosure herein.
Figure 4:
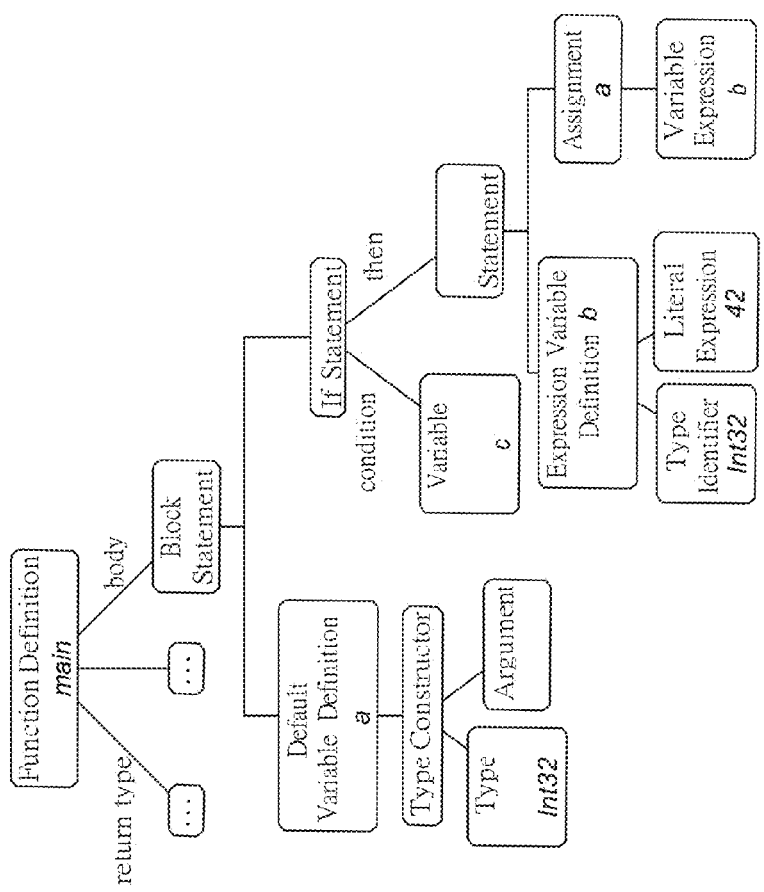
FIG. 4 is an illustration of an example extract of an Abstract Syntax Tree (AST) represent a function body, in accordance with the principles of the disclosure herein.
Figure 5:
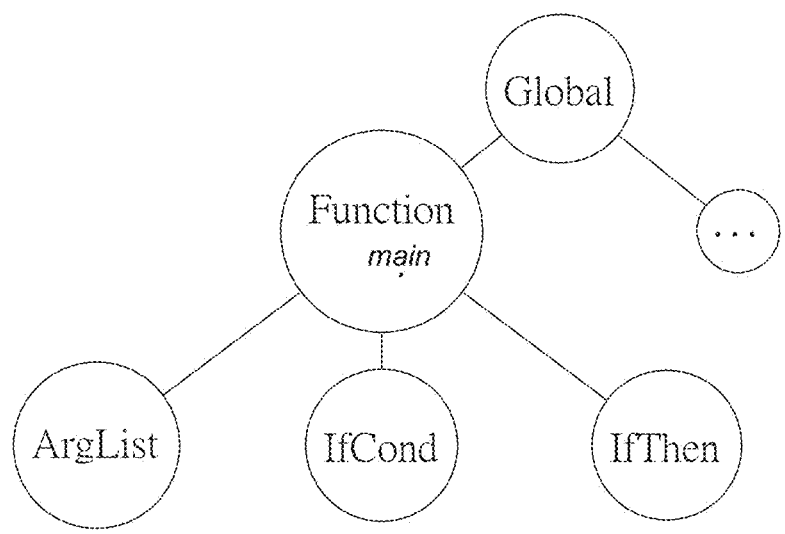
FIG. 5 is a schematic illustration of example scope hierarchies, which may be built or defined by a symbol table phase of a complier in the context of Abstract Syntax Tree (AST) representation of a function in a source program, in accordance with the principles of the disclosure herein.

FIGS. 3-5 shows, for example, extracts AST 300-500, respectively, of an AST, which may be generated by complier 120 (e.g., by parse phase 211), for an example source function (e.g., Function 5 shown below).

```
Function 5
Void main ( Bool c ) {
Int 32 a ;
if ( c ) {
Int 32 b = 4 2 ;
a = b ;
}
}
```

It will be noted that example Function 5 includes a function "main" defining one formal parameter "c" of type "Bool". The function does not have any return type, which is indicated by the type identifier "Void".

Extract AST 300 shown in FIG. 3 represents the function definition of Function 5. Extract AST 300, may, for example, include the following node types:
  Function Definition Node: Representing the function definition of the function "main"
  Type Identifier Node: Used for both the return type of the function "main" and for the type of the parameter "c"
  Block Statement Node: Contains statement nodes representing the body of the function "main"
  Formal Parameter List Node: Represents a list of formal parameters
  Formal Parameter Node: Represents the parameter "c"

It will be further noted that example Function 5, as listed above, has a function body that includes two variable definitions: One for the variable a and one for the variable b and an assignment of variable b to a. Variable b is, thereby, initialized with a constant value of 42. The declaration of b and the assignment are contained in a conditional statement. They are only executed if the parameter c evaluates to true.

Extract AST 400 shown in FIG. 3 may represent the function body of Function 5. Extract AST 400, may, for example, include the following additional node types:
  Default Variable Definition Node: Represents the definitions of the variable a with a default initialization
  Expression Variable Definition Node: Represents the definitions of the variable b initialized with an expression
  Type Constructor: Indicates the use of a type specific constructor for the initialization of variable a
  Argument List: Possibly contains arguments for the type constructor
  Variable Expression Node: Represents the use of the parameter c Literal
  Expression Node: Represents the constant expression 42
  Assignment Node: Represents the assignment of b to a
  If Statement Node: Represents the conditional statement As previously mentioned symbol table phase 212 in compiler 120 may generate a symbol table which creates scopes and builds up a scope hierarchy. The symbol table may virtually assign scopes to all AST nodes. FIG. 5 shows example scope hierarchies 500, which may be built or defined by symbol table phase 212 in the context of extract AST 300 and extract AST 400 for Function 5. In scope hierarchy 500, a global scope may be assigned to the function definition, and the type identifier node representing the return type. Further, a so-called function scope may be assigned to all formal parameters and to the AST nodes representing the function body.

As previously noted the function splitting processes of function splitting unit 140 may be integrated with the operation and processes of complier 120 (e.g., phases 211-213).

In an example implementation, the function splitting processes may be implemented in frontend 210 as an AST transformation phase, in accordance with the principles of the present disclosure. The function splitting processes of function splitting unit 140 may be implemented after all semantic analysis of source program 110 is complete (e.g., phases 211-213) in complier 120 before proceeding to code generation phase 214 (as shown schematically in FIG. 2). In some alternate versions of compiler 120, the function splitting processes of function splitting unit 140 may be implemented together with the semantic analysis of source program 110 (e.g., in phase 213).

Figure 6:
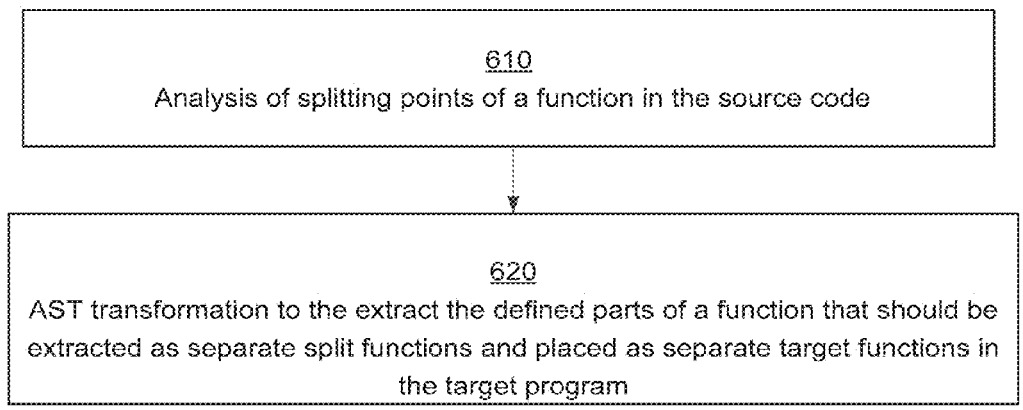
FIG. 6 is a flowchart illustration of an example function splitting technique utilized in by function splitting unit coupled to a compiler, in accordance with the principles of the disclosure herein.

As shown in FIG. 6, an example function splitting technique 600 utilized in function splitting unit 140 may include algorithms and processes for analysis of splitting points or nodes of a function in the source code (610), which may define parts of a function that should be extracted as separate split functions. Function splitting technique 600 utilized in function splitting unit 140 may further include algorithms and processes for an AST transformation involving extraction of the defined parts of the function (that should be extracted as separate split functions) and placing or inserting the extracted split functions as separate target functions in a transformed AST (620).

The following terminology (viewed in conjunction with FIGS. 7 and 8) may be used in the description herein of the analysis of splitting points and the AST transformations used in technique 600, which modify both the AST and the scope hierarchy:

Source functions: Functions (e.g., user-defined functions) in the source program.

Target functions: Functions generated by the function splitting

Splitting region: A part of a source function that should be extracted to a target function. A splitting region is defined as a sequence of consecutive statement nodes, which share one parent node. The descendant nodes of those statement nodes are part of the splitting region. A source function may contain more than one splitting region. However, splitting regions are not allowed to partially overlap. The parent node of a splitting region is always a block statement.

Figure 7:
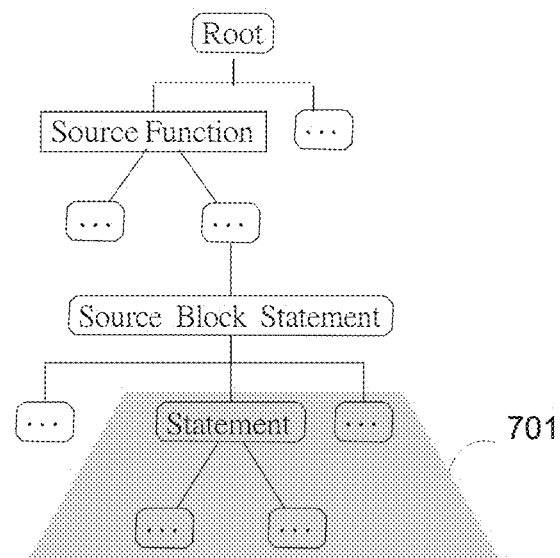
FIG. 7 illustrates an example Abstract Syntax Tree (AST) representation of a source program before function splitting, in accordance with the principles of the disclosure herein.
Figure 8:
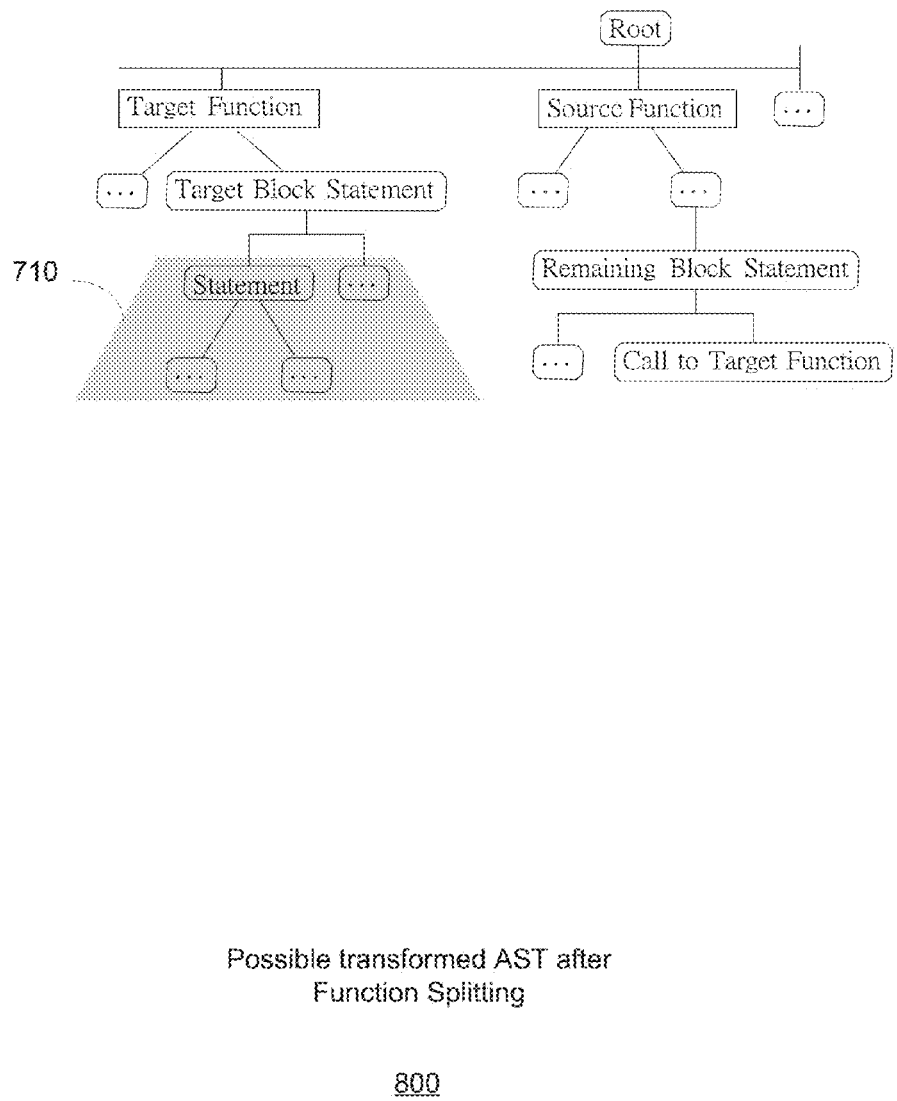
FIG. 8 illustrates an example transformed Abstract Syntax Tree (AST) representation of the source program of FIG. 7 after function splitting, in accordance with the principles of the disclosure herein.

FIG. 7 illustrates an example AST 700 of a source program before function splitting. An example splitting region 701 of a source function under a Source Block Statement is marked in the figure, for purposes of illustration, as a shaded trapezoid. FIG. 8 illustrates, for example, a possible "transformed" AST 800 in which splitting region 701 is extracted from the source function of FIG. 7 and moved to a target function under a new block statement (e.g., Target Block Statement). All remainder source block statements, which are not contained in any splitting region, may be placed in the so-called "Remaining Block Statement" in transformed AST 800. These block statements may also include function calls to the target function.

Figure 9:
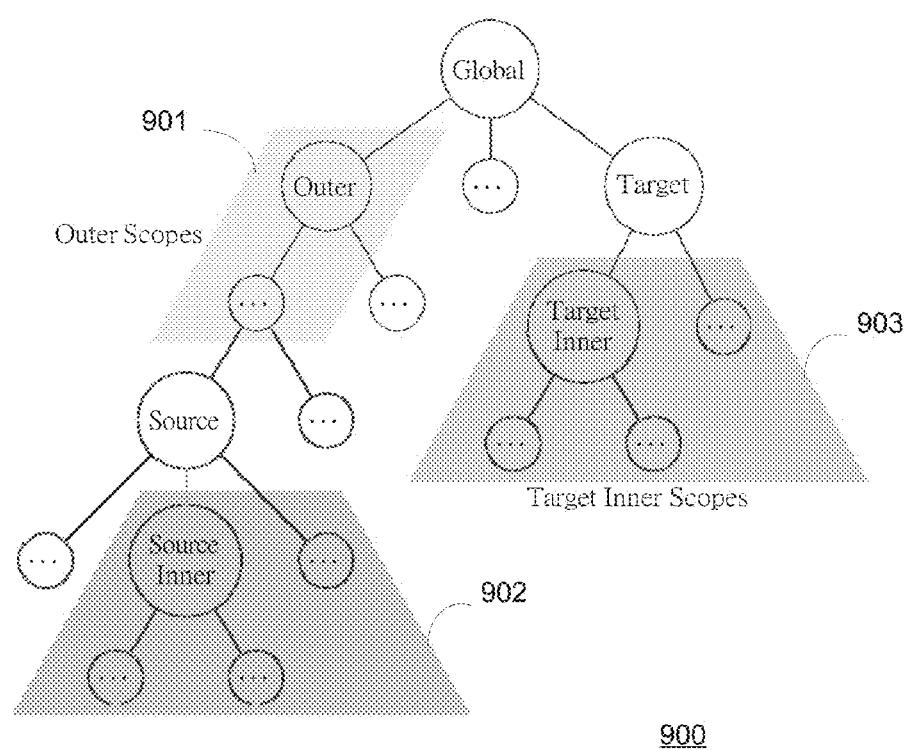
FIG. 9 illustrates an example Abstract Syntax Tree (AST) in the context of the terminology used herein to refer to scopes.

FIG. 9 illustrates the terminology used herein to refer to scopes using, for example, an example AST 900. The term "scope" refers to a well-defined region of a program, which delimits visibility of variables and other identifiers, such as a function or a block of statements.

Source scope: The scope of the source block statement at which the splitting region is defined. Different splitting regions might share the same source scope.

Outer scopes: All scopes on the path from the source scope to the global scope are referred to as outer scopes. FIG. 9 shows an example outer scope 901 as a shaded trapezoidal region.

Target scope: The scope of the target block statement. This is the function scope of the generated target function. The parent of a target scope is always the global scope. It is not possible for splitting regions to share one common target scope, since each splitting region is extracted to a different target function.

Inner scope: Refer to all descendants of a target scope and to a subset of the descendants of a source scope. The set of inner scopes consists of all scopes that are assigned to any of the AST nodes contained in a splitting region except for the source scope and the target scope Inner scopes are either called source inner scope or target inner scope depending on whether they have the source or the target scope as ancestor. FIG. 9 shows an example source inner scope 902 and an example target inner scope 903 as shaded trapezoidal regions.

With renewed reference to FIG. 6, function splitting technique 600 utilized in function splitting unit 140 may include algorithms for analysis and identification of possible splitting points or nodes (and hence the splitting regions defined by the splitting points) in the source function. The algorithms for identification of possible splitting points or nodes may involve considerations of a granularity of splitting and one or more complexity metrics. In an example implementation of function splitting technique 700, a granularity of splitting may be selected to include splitting the source function at a single statement splitting, splitting at a block statement level splitting, or splitting at a multiple statement level. The granularity of splitting may affect the selection of splitting points and hence the number or size of the splitting regions that can be extracted and transferred from the source function to target functions. The one or more complexity metrics may, for example, include a count of lines of code in a candidate splitting region or a weighted count of nodes in a candidate splitting region. Different types of nodes in the AST (e.g., nodes corresponding to variables, statements, expressions or complex types) may be assigned different weights in the weighted count of nodes in a candidate splitting region based, for example, on considerations of the impact of the different types of nodes on compilation time.

In example implementations of function splitting technique 600, a maximum source function complexity level may be predefined. Use of function splitting technique 600 may be necessary or desirable only when the source function has a complexity level that exceeds the maximum complexity level. Similarly, an upper splitting region complexity level and a lower splitting region complexity level may be predefined. When a candidate splitting region has a complexity which is greater than the upper splitting region complexity level (e.g., comparable to the original complexity of the source function), the goal of reducing compile time of the source program may not be achieved. Conversely, when a candidate splitting region has a complexity which is smaller than the lower splitting region complexity level, an overhead associated with the target function (e.g., insertion of a function call to the target function) in the transformed AST may negate or compromise the goal of reducing compile time of the source program. A scenario in which a block statement has a complexity greater than the upper splitting region complexity level while each of its child statements has a complexity smaller than the upper splitting region complexity level may be handled only by multiple statement splitting.

Further constraints on the analysis and identification of possible splitting points or nodes and candidate splitting regions by function splitting technique 700 may arise from limitations on the types of splitting regions that may be properly supported for AST transformation to separate split functions (FIG. 6, 620). For example, since position of the splitting regions is not restricted, a post order traversal of the AST may visit splitting regions defined at a source block statement between splitting regions defined at another source block statement. However, nested splitting regions may be not supported for AST transformation. Variable declarations in the source scope inside of a splitting region may be supported only if the variable is neither defined nor used outside of the splitting region. Variable declarations in the source scope outside of a splitting region may be always supported. Return statements may be not supported. Further, continue and break statements may be only supported in the case that they do not transfer control flow to a point outside of the splitting region.

In example implementations of function splitting technique 600, analysis of splitting points or nodes of a function in the source code 610 may use a single traversal of the AST. Thus, the algorithms identifying the splitting points and defining the splitting regions may have to be implemented as a post order traversal. Whenever a candidate statement is considered to be part of a splitting region all of its child nodes may have already been visited. The algorithms may be configured to determine whether the candidate statement contains unsupported statements or whether the candidate statement is already part of a splitting region (to avoid forming nested splitting regions).

FIGS. 10-12 show pseudo code representations of example algorithm 1000, algorithm 1100 and algorithm 1200, respectively, that may be implemented or used by function splitting technique 700 for multiple-statement and block level splitting of a source function. The algorithms may be configured to traverse the AST node-by-node to identify splitting points and define splitting regions in a single traversal or pass of the AST. The single traversal or pass use of the algorithms in function splitting technique 700 may result in an execution time "t" of the algorithms for function splitting of the source function being a substantially linear function of source function size (e.g., t~O (n), where n is the number of nodes in the AST).

Example algorithm 1000 may be used to identify candidate splitting statements to define splitting regions on a block statement, which have complexities that are limited by a given minimal and a given maximal complexity. Example algorithm 1000 may create a splitting candidate for the first statement of the given block statement. This candidate splitting statement may be enlarged by the subsequent statements provided that the candidate splitting statement is splitable. The candidate splitting statement may be splitable, for example, when the candidate splitting statement is supported and neither contains unsupported statements nor splitting regions. The candidate splitting statement may also be splitable, for example, only when the candidate splitting statement is not a variable declaration, and the complexity of candidate splitting statement and all statements in the (enlarged) candidate splitting statement do not exceed the predetermined maximal complexity.

Each time algorithm 1000 identifies a candidate splitting statement as being a splittable statement (i.e. having complexities that are limited by the given minimal and the given maximal complexity), algorithm 1100 may be executed to identify or create a corresponding multiple statement splitting region. When the candidate splitting statement is enlarged so that the candidate splitting statement exceeds the given maximal complexity, a new splitting candidate initially including only the candidate splitting statement may be created. The new splitting candidate may be enlarged by the subsequent statements using algorithm 1000 in the same manner as the first statement.

When the candidate splitting statement cannot be enlarged using algorithm 1000, it may be either discarded as a candidate or transformed into a splitting region with statement level splitting granularity, using, for example, algorithm 1100, or a splitting region with block statement level splitting granularity using, for example, algorithm 1200.

It will be noted that when algorithm 1000 is used to identify candidate splitting statements, a candidate splitting statement exceeding the predetermined maximal complexity may exist only if the candidate splitting statement is not splittable. Such a non-splittable candidate splitting statement may by itself be transformed into a splitting region with block statement level splitting granularity using, for example, algorithm 1200.

Algorithm 1200 for block statement level splitting may be executed after algorithms 1000 and 1100 for multiple statement splitting are executed. Algorithm 1200 may create a splitting region containing all statements of the block statement or create no splitting region. Algorithm 1200 may expect as input a block statement having at least a minimal complexity. Algorithm 1200 may check if the complexity of the input block statement has at least the minimal complexity and if the block statement is splittable. In the case that both of the conditions are met, algorithm 1200 may create a corresponding splitting region containing all statements of the block statement.

It is noted that algorithm 1200 does not check whether the complexity of the input block statement exceeds the maximal complexity. Such checking of maximal complexity may be unnecessary as all child nodes of the input block statement may have already been evaluated as candidate splitting points (e.g., by algorithm 1000) and corresponding splitting regions defined (e.g., by algorithm 1100) for any splittable child nodes. When no splitting regions have been defined on the child nodes of the input block statement, algorithm 1200 splits the entire input block statement even if the maximal complexity is exceeded. This feature of algorithm 1200 may ensure that no child node is omitted and that all child nodes in the input block statement are contained in a splitting region of the AST even when the maximal complexity is exceeded.

Figure 13:
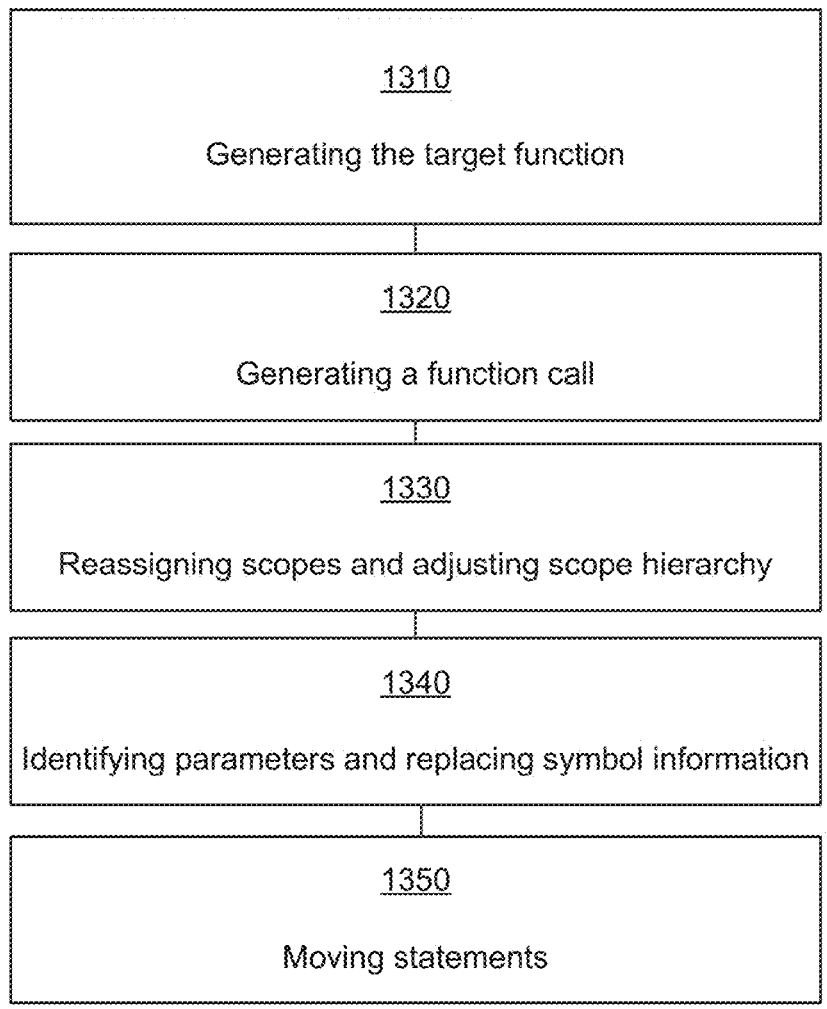
FIG. 13 is a flowchart illustration of an example process for placement or insertion of a splitting region of a source function as a target function in a transformed AST, in accordance with the principles of the present disclosure.

After creating a splitting region in a source function, a corresponding target function may be generated for placement or insertion in the transformed AST. Like the source function, the target function may be represented by a function definition in the transformed AST. FIG. 13 shows an example process 1300 for placement or insertion of a splitting region of a source function as a target function in the transformed AST, in accordance with the principles of the present disclosure.

Process 1300 may involve generating the target function (1310), generating a function call (1320), reassigning scopes and adjusting scope hierarchy (1330), identifying parameters and replacing symbol information (1340) and moving statements (1350).

Figure 14:
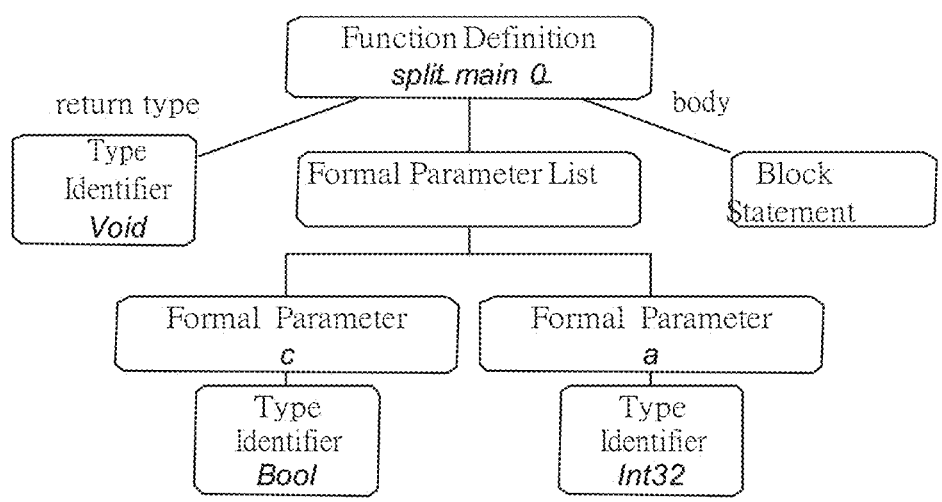
FIG. 14 illustrates an example Abstract Syntax Tree (AST) having generated nodes for a target function, in accordance with the principles of the present disclosure.

Generating the target function 1310 may involve creation of AST nodes, updating the symbol table and semantic analysis. Creating AST nodes for the target function may include creating a Function Definition Node (e.g., a node representing the function, a Type Identifier Node (e.g., a node representing the return type of the function), a Block Statement Node (e.g., a list node representing the body of the function) and a Formal Parameter List Node (e.g., a list node containing the formal parameters). FIG. 14 shows an example AST 1400 with nodes generated for a target function (using Function 5 as an example source function).

With renewed reference to FIG. 13, generating a function call 1320, like generating the target function 1310 may involve creating AST nodes, updating the symbol table, updating and semantic analysis.

Figure 15:
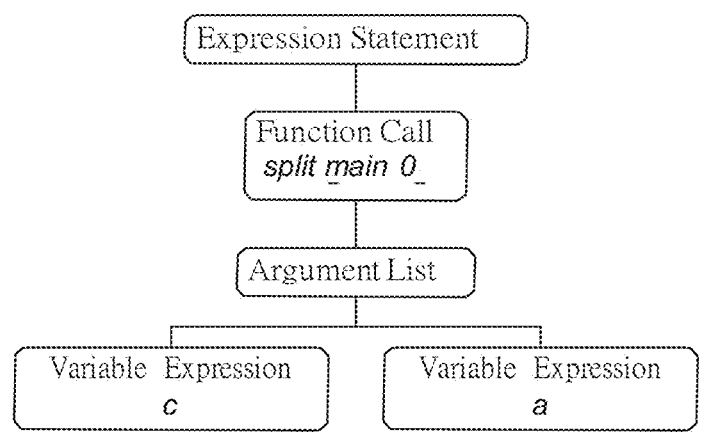
FIG. 15 illustrates an example Abstract Syntax Tree (AST) having generated nodes for a function call (using the target function of FIG. 14 as an example), in accordance with the principles of the present disclosure.

Creating AST nodes for the function call may involve creating a Function Call Node (e.g., a node representing the function call), an Argument List Node (e.g., a list node containing the actual parameters), a Variable Expression Node (e.g., a node representing an actual parameter), and an Expression Statement Node (e.g., a node wrapping the function call). FIG. 15 shows an example AST 1500 with generated nodes for a function call (using the target function of FIG. 14 as an example). The Function Call Node may hold the name of the callee (i.e., the name created for the target function).

Again with reference to FIG. 13, process 1300 for placement or insertion of a splitting region of a source function as a target function in the transformed AST, may involve reassigning scopes and adjusting scope hierarchy 1330 in the transformed AST.

Figure 16:
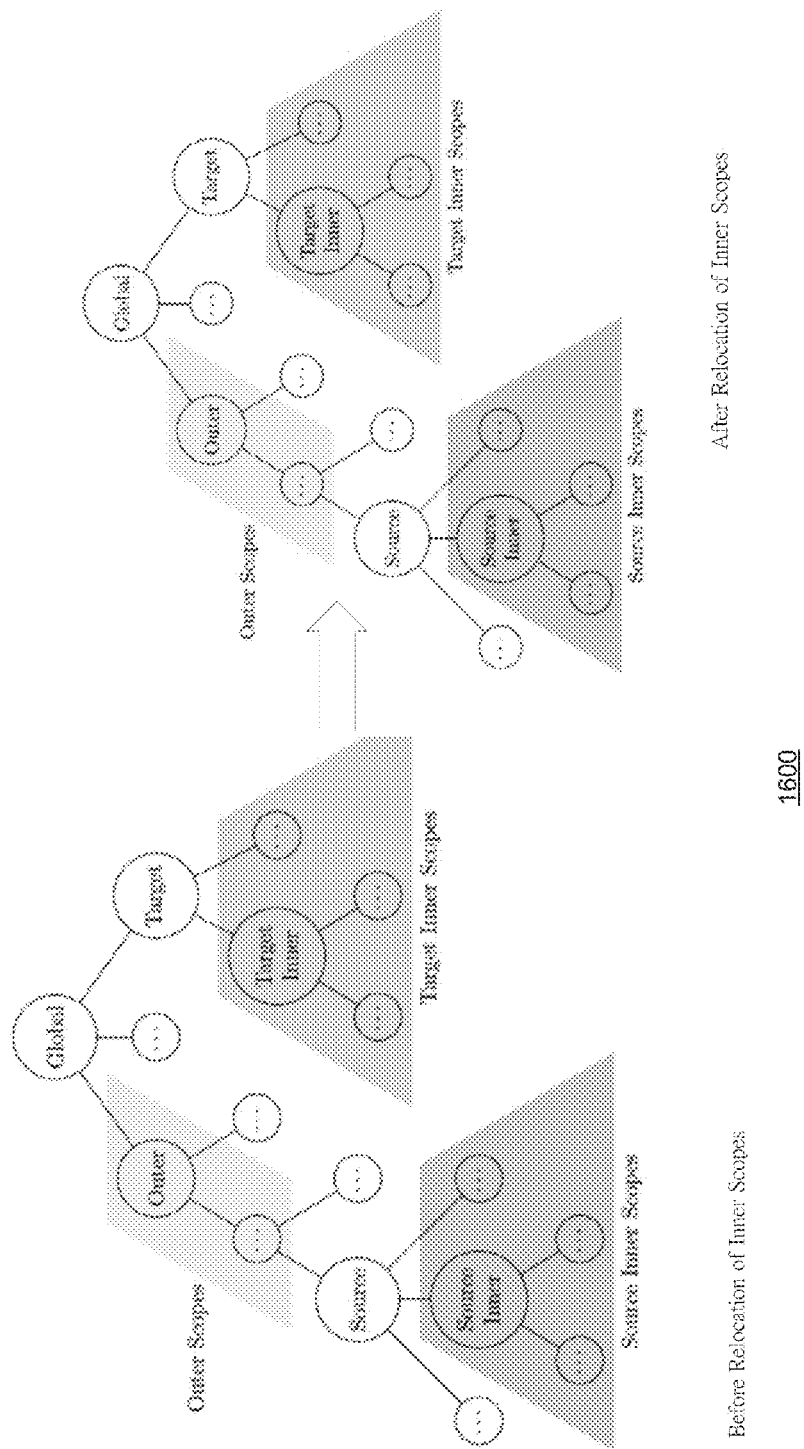
FIG. 16 illustrates an example of the transformation of the scope hierarchy that may be accomplished by scope replacement and scope hierarchy adjustment algorithms, which may be used by the process of FIG. 13, in accordance with the principles of the present disclosure.

As previously noted a scope has to be assigned to each of the generated AST nodes. The source scope may be assigned to the expression statement and the function call node (FIG. 15). A target scope may be created for each target function replacing the source scope for all nodes contained in the splitting region of the source code that the target function represents. In addition, the scope hierarchy may have to be updated if some nodes of the splitting region are assigned to an inner scope. It may be sufficient to replace the parent scope of those scopes which are child scopes of the source scope. In general, the hierarchy within the inner scopes may not change. FIG. 16 shows an example 1600 of the transformation of the scope hierarchy that may be accomplished by scope replacement and scope hierarchy adjustment algorithms, which may be used by process 1300.

Process 1300 for placement or insertion of a splitting region of a source function as a target function in the transformed AST further involves identifying parameters and replacing symbol information 1340. To support variable declarations in the source scope inside of a splitting region it may be required to update the symbol table. However, since the variable declaration are moved from the source scope to the target scope in the transformed AST, identifying parameters and replacing symbol information 1340 may involve replacing the existing symbol table entry by a corresponding symbol table entry for the target scope.

Process 1300 for placement or insertion of a splitting region of a source function as a target function in the transformed AST includes moving statements 1350. Moving statements 1350 may involve moving all AST nodes of the splitting regions of the source function to the corresponding target functions and inserting a call to the target function each moved splitting region.

FIG. 17 shows a pseudo code representation of an example algorithm 1700 that may be used by process 1300 to move each statement of the source block statement to either the remaining source block statement or to the target block statement of a splitting region (FIG. 8). Example algorithm 1700 may also inserts calls to the target function in the remaining block statement of the source function (FIG. 8).

After the source program AST has been transformed by the splitting of source functions and insertion of the corresponding splitting regions as transfer functions in a transformed AST, backend 220 of compiler 140 may compile the transformed AST to generate machine-executable target program 130 (FIG. 2). Since the transformed AST includes target functions that have a smaller size than the source functions in source program 110, smaller compile times may be expected.

The various systems and techniques described herein may be implemented in digital electronic circuitry, or in computer hardware, firmware, or in combinations of them. The various techniques may implemented as a computer program product, i.e., a computer program tangibly embodied in a machine readable storage device, for execution by, or to control the operation of, data processing apparatus, e.g., a programmable processor, a computer, or multiple computers.

Method steps may be performed by one or more programmable processors executing a computer program to perform functions by operating on input data and generating output. Method steps also may be performed by, and an apparatus may be implemented as, special purpose logic circuitry, e.g., an FPGA (field programmable gate array) or an ASIC (application specific integrated circuit).

Processors suitable for the execution of a computer program include, by way of example, both general and special purpose microprocessors, and any one or more processors of any kind of digital computer. Generally, a processor will receive instructions and data from a read only memory or a random access memory or both. Elements of a computer may include at least one processor for executing instructions and one or more memory devices for storing instructions and data. Generally, a computer also may include, or be operatively coupled to receive data from or transfer data to, or both, one or more mass storage devices for storing data, e.g., magnetic, magnetooptical disks, or optical disks. Information carriers suitable for embodying computer program instructions and data include all forms of nonvolatile memory, including by way of example semiconductor memory devices, e.g., EPROM, EEPROM, and flash memory devices; magnetic disks, e.g., internal hard disks or removable disks; magnetooptical disks; and CDROM and DVD-ROM disks. The processor and the memory may be supplemented by, or incorporated in special purpose logic circuitry.

To provide for interaction with a user, implementations may be implemented on a computer having a display device, e.g., a cathode ray tube (CRT) or liquid crystal display (LCD) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

Implementations may be implemented in a computing system that includes a backend component, e.g., as a data server, or that includes a middleware component, e.g., an application server, or that includes a frontend component, e.g., a client computer having a graphical user interface or a Web browser through which a user can interact with an implementation, or any combination of such backend, middleware, or frontend components. Components may be interconnected by any form or medium of digital data communication, e.g., a communication network. Examples of communication networks include a local area network (LAN) and a wide area network (WAN), e.g., the Internet.

While certain features of the described implementations have been illustrated as described herein, many modifications, substitutions, changes and equivalents will now occur to those skilled in the art. It is, therefore, to be understood that the appended claims are intended to cover all such modifications and changes as fall within the scope of the embodiments.

What is claimed is:

1. A method for reducing a compile time of a source program, the method comprising:
    receiving, by a compiler hosted on a computer, the source program;
    analyzing the source program to construct an Abstract Syntax Tree (AST) representation of the source program before compilation, wherein the nodes of the AST represent one or more of language constructs, statements, expressions, types, and function definitions of the source program;
    traversing the AST node-by-node to identify splitting points and define splitting regions of a source function in the AST of the source program in a single pass of the AST;
    identifying a defined splitting region as a candidate splitting region of the source function in the AST of the source program before compilation, wherein identifying the defined splitting region as the candidate splitting region includes determining a complexity of the defined splitting region, assessing an impact of the complexity of the defined splitting region on reducing compile time of the source program and identifying the defined splitting region as the candidate splitting region only if the complexity of the defined splitting region is less than an upper splitting region complexity level and only if an overhead associated with a target function does not negate a goal of reducing compile time of the source program, wherein a complexity measure is a count of lines of code in the defined splitting region or a weighted count of nodes in the defined splitting region;
    extracting the candidate splitting region of the source function before compilation to form the target function;
    transforming the AST of the source program before compilation by inserting nodes corresponding to the target function in the AST; and
    using the transformed AST to generate a machine-executable target program.

2. The method of claim 1, wherein identifying the candidate splitting region of the source function in the AST includes one of splitting at a single statement level, splitting at a block statement level splitting, and splitting at a multiple statement level.

3. The method of claim 1, wherein transforming the AST by inserting nodes corresponding to the target function includes generating the target function corresponding to the candidate splitting region of the source function and representing the target function by a function definition in the transformed AST.

4. The method of claim 3, wherein transforming the AST by inserting nodes corresponding to the target function includes generating a function call to the target function in the transformed AST.

5. The method of claim 3, wherein transforming the AST by inserting nodes corresponding to the target function includes moving a statement from the candidate splitting region of the source function to the target function in the transformed AST.

6. The method of claim 1, wherein identifying the candidate splitting region of the source function in the AST includes traversing the AST in a single pass to identify splitting points and define splitting regions in the AST.

7. The method of claim 1, wherein the complier generates a symbol table with symbols for variables, parameters, functions, data types, library names, and namespaces and attaches one or more symbols to nodes of the AST.

8. A system comprising:
    a computer machine including a memory and a semiconductor-based processor;
    a compiler configured to construct an Abstract Syntax Tree (AST) representation of a source program before compilation, wherein the nodes of the AST represent one or more of language constructs, statements, expressions, types, and function definitions of the source program; and
    a function splitting unit configured to:
    traverse the AST node-by-node to identify splitting points and define splitting regions of a source function in the AST of the source program in a single pass of the AST;
    identify a defined splitting region as a candidate splitting region of the source function in the AST of the source program before compilation, wherein identifying the defined splitting region as the candidate splitting region includes determining a complexity of the defined splitting region, assessing an impact of the complexity of the defined splitting region on reducing compile time of the source program and identifying the defined splitting region as the candidate splitting region only if the complexity of the defined splitting region is less than an upper splitting region complexity level and only if an overhead associated with a target function does not negate a goal of reducing compile time of the source program, wherein a complexity measure is a count of lines of code in the defined splitting region or a weighted count of nodes in the defined splitting region;
    extract the candidate splitting region of the source function in the AST of the source program before compilation to form the target function; and
    transform the AST of the source program before compilation by inserting nodes corresponding to the target function in the AST; and
    wherein the complier is further configured to use the transformed AST to generate a machine-executable target program.

9. The system of claim 8, wherein the function splitting unit is configured to identify the candidate splitting region of the source function in the AST for one of splitting at a single statement level, splitting at a block statement level, and splitting at a multiple statement level of the source function.

10. The system of claim 8, wherein the function splitting unit is configured to identify the candidate splitting region of the source function in the AST by traversing the AST in a single pass to identify splitting points and define splitting regions in the AST.

11. The system of claim 8, wherein the function splitting unit is configured to transform the AST by inserting nodes corresponding to the target function by generating the target function corresponding to the candidate splitting region of the source function and representing the target function by a function definition in the transformed AST.

12. The system of claim 11, wherein the complier is configured to assign scopes to all AST nodes and establishes a scope hierarchy in the AST.

13. The system of claim 11, wherein the function splitting unit is configured to move statements from the candidate splitting region of the source function to the target function in the transformed AST.

14. A computer program product, the computer program product being tangibly embodied on a non-transitory computer-readable storage medium and comprising instructions that, when executed, are configured to cause a computing device to:
receive, by a compiler, a source program;
analyze the source program to construct an Abstract Syntax Tree (AST) representation of the source program before compilation, wherein the nodes of the AST represent one or more of language constructs, statements, expressions, types, and function definitions of the source program;
traverse the AST node-by-node to identify splitting points and define splitting regions of a source function in the AST of the source program in a single pass of the AST;
identify a defined splitting region as a candidate splitting region of the source function in the AST of the source program before compilation, wherein identifying the defined splitting region as the candidate splitting region includes determining a complexity of the defined splitting region, assessing an impact of the complexity of the defined splitting region on reducing compile time of the source program and identifying the defined splitting region as the candidate splitting region only if the complexity of the defined splitting region is less than an upper splitting region complexity level and only if an overhead associated with a target function does not negate a goal of reducing compile time of the source program, wherein a complexity measure is a count of lines of code in the defined splitting region or a weighted count of nodes in the defined splitting region;
extract the candidate splitting region of the source function before compilation to form the target function;
transform the AST of the source program before compilation by inserting nodes corresponding to the target function in the AST; and
use the transformed AST to generate a machine-executable target program, program.

15. The computer program product of claim 14, wherein identifying the candidate splitting region of the source function in the AST includes one of splitting at a single statement level, splitting at a block statement level splitting, and splitting at a multiple statement level.

16. The computer program product of claim 14, wherein transforming the AST by inserting nodes corresponding to the target function includes generating the target function corresponding to the candidate splitting region of the source function and representing the target function by a function definition in the transformed AST.

17. The computer program product of claim 16, wherein transforming the AST by inserting nodes corresponding to the target function includes generating a function call to the target function in the transformed AST.

18. The computer program product of claim 16, wherein transforming the AST by inserting nodes corresponding to the target function includes moving a statement from the candidate splitting region of the source function to the target function in the transformed AST.

19. The computer program product of claim 14, wherein identifying the candidate splitting region of the source function in the AST includes traversing the AST in a single pass to identify splitting points and define splitting regions in the AST.

20. The computer program product of claim 14, wherein the complier generates a symbol table with symbols for variables, parameters, functions, data types, library names, and namespaces and attaches one or more symbols to nodes of the AST.

* * * * *